United States Patent [19]
Meltsch et al.

[11] Patent Number: 5,728,438
[45] Date of Patent: Mar. 17, 1998

[54] SHRINKABLE COVERING AND METHOD OF MANUFACTURE

[75] Inventors: Hans-Juergen Meltsch, Schwerte; Ulrich Affolderbach, Wuppertal, both of Germany

[73] Assignee: Siemens Aktiengesellschaft, Munich, Germany

[21] Appl. No.: 605,861

[22] Filed: Feb. 23, 1996

[30] Foreign Application Priority Data

Feb. 23, 1995 [DE] Germany .................. 195 06 406.2

[51] Int. Cl.⁶ .................................................. B29C 55/00

[52] U.S. Cl. ................. 428/36.1; 156/229; 428/36.2; 428/36.3; 428/68; 442/2; 442/20; 442/191; 442/197; 442/209; 442/212; 442/213

[58] Field of Search .................. 428/36.1, 36.2, 428/36.3, 68; 442/2, 20, 191, 197, 209, 212, 213; 156/229

[56] References Cited

U.S. PATENT DOCUMENTS 5,141,812   8/1992   Marx et al. .................. 428/377

FOREIGN PATENT DOCUMENTS 0 115 905   9/1988   European Pat. Off.
38 33 415   4/1990   Germany.

Primary Examiner—James J. Bell
Attorney, Agent, or Firm—Hill, Steadman & Simpson

[57] ABSTRACT

An improved shrinkable covering made of a shrinkable plastic compound having an inlay of non-recoverable threads and recoverable threads has the recoverable threads arranged with excess length, preferably in helical form, and extending in the stretching and shrinking direction of the covering. As a consequence of this excess length, the recoverable threads are not subjected to any additional stretching during the stretching process of the covering. The recoverable threads act as "swelling agents" in the shrinking process and seal off any longitudinal capillary cavities which may be produced during the production process of the shrinkable covering.

26 Claims, 1 Drawing Sheet

SHRINKABLE COVERING AND METHOD OF MANUFACTURE

BACKGROUND OF THE INVENTION

The present invention is directed to a shrinkable covering made of a plastic compound having an inlay of thermally recoverable threads and non-recoverable threads, with the recoverable threads being arranged in the stretching and shrinking direction of the covering and to the method of forming the covering.

DE-A-38 33 415 discloses a process for producing a heat-recoverable strip in which an inlay comprising a mat or a woven fabric is incorporated in a heat-recoverable polymer matrix. This inlay is composed of non-recoverable crossing strands, with the strands being wound in the form of a helix on a strand of plastic in the stretching and shrinking direction of the strip.

EP-A-0 115 905 discloses a heat-recoverable textile material in which the recovery is accomplished by shrinkable threads. These recoverable threads are woven with non-recoverable threads to form a woven fabric. The recoverable threads are arranged so that they run in the shrinking direction. To make the woven fabric waterproof, a heat-softening, polymeric plastic material is applied which allows the shrinkage effected by the recoverable threads, but itself does not contribute to the shrinkage. Since the shrinking threads are already used for the shrinking effect, stretching of the overall composite is dispensed with in this case.

SUMMARY OF THE INVENTION

It is thus an object of the present invention to find a tear-resistant, heat-shrinkable covering which has an inlay of threads, is based on the already-known shrinkable covering made of shrinkable matrix materials, but, for increased mechanical demands, is provided with an inlay of threads which, as far as possible, do no hinder the stretching or shrinking process and, at the same time, meet the requirements with respect to good adhesion of the inlay in the composite.

To accomplish these goals, the present invention is directed to an improvement in a shrinkable covering made of a plastic compound of a shrinkable material, said covering having an inlay of thermally-recoverable threads and non-recoverable threads, the recoverable threads being arranged in a stretching and shrinking direction of the covering. The improvement is that the thermally-recoverable threads are arranged with an excess length in the stretching and shrinking direction of the shrinkable covering so that during stretching, they are not stretched but are drawn out to almost their total length.

It is ensured by the invention that a heat-shrinkable covering with a polymer matrix known per se of a shrinkable plastic compound can also be used for a robust mechanical use if, according to the invention, a corresponding inlay in the form of a laid or woven fabric is incorporated for increased tear resistance. In this case, it is of advantage that the inlay of threads does not significantly hinder either the stretching process or the shrinking process, so that the shrinking forces applied by the shrinkable polymer matrix are fully available for the shrinking process. The threads running in the stretching and shrinking direction must, in this case, be arranged so that the stretching of the cross-linked covering is possible without these threads being stretched. For this reason, these threads are arranged in excess length with the resulting direction running in the stretching and shrinking direction so that, during the stretching process, these threads can be drawn out to almost their full length without themselves being stretched.

In such a stretching process, however, along the threads there are produced longitudinal capillary cavities into which moisture could penetrate so that under some circumstances, damage may occur. In the case of the invention, however, the threads running in the shrinking direction are thermally recoverable or shrinkable threads and are incorporated with excess length which, however, provides virtually no shrinking force in the actual shrinking process of the covering on account of the excess length. However, it is of advantage that the recoverable threads incorporated in excess length likewise change their geometry and thereby increase their diameter under the effect of the shrinking temperature. They consequently serve to a certain extent as a "swelling agent". In this way, the longitudinal capillary cavities produced during the stretching are filled impermeably, so that moisture can no longer penetrate. The "swelling effect" is thus based on the fact that, due to the dimensional change with the same volume, that is to say the shortening of the length and the increasing of the diameter, of the recoverable threads, the filling of the longitudinal cavities produced during stretching will take place. In addition, since the identity and compatibility of the two materials favors the mutual adhesiveness, it is an advantage that the adhesion between the polymer matrix and the threads of the reinforcing inlay is significantly improved.

Thus, according to the invention, the recoverable threads, which, however, are not used for the shrinkage of the covering, and with an excess length lying in the stretching and shrinking direction of the covering. The introduction of the excess length may take place in a random way or else in the form of a helix. The latter form may be configured more or less as a self-supporting helix or else as a helix on a carrier thread. The carrier thread must, however, allow itself to be drawn out without tearing during stretching. In addition, the carrier thread is preferably composed of a similar or identical material to the polymer matrix, for example of a polyethylene so that mutual adhesiveness is favored. This carrier thread has a thread, which, at a temperature of 60° C. to about 200° C., will stretch over the radius or can recover in length, spun around the carrier thread. The spinning taking place in such a way that the recoverable thread is not stretched, is scarcely stretched or is only slightly stretched upon full stretching of the overall covering. Thus, the winding-around is relatively close and comprises a 6–10-fold "length storage" of the helix on the carrier thread.

As a result, no forces or only very small forces are applied by the threads for the recovery of the covering. Such carrier threads with recoverable threads spun around them in such a way are subsequently processed as weft threads with warp threads of the tear-resistant material to form a woven or laid fabric, which is then embedded between the polyethylene layers or into a polyethylene layer. The further processing then takes place as in the case of the conventional shrinkable covering, that is to say they are subject to either radiation cross-linkage or silane cross-linkage and subsequently stretched. In the case of radiation cross-linkage, the wound-on recoverable threads must preferably be produced from a modified plastic compound which still has adequate expansion characteristics after cross-linkage. It is intended here for there to recur wherever possible cohesion, or at least good adhesion, between the outer layers, the wound-on recoverable threads and the carrier threads in order to establish the necessary composite.

The spinning of a recoverable thread around the carrier thread may be performed continuously over the entire length, in sub-sections or else only as ring windings.

The aimed-for compatibility of the materials used for the outer layers, the carrier threads and recoverable threads has the effect of largely preventing any drawing up of the outer layers, that is to say the formation of longitudinal capillary cavities in the region of the recoverable or shrinkable threads and the carrier threads. This is also brought about by the fact that there is bonding of the threads to the material of the outer layers.

The problem of separation or adhesion in the regions of mutual contact likewise exists also when glass threads are used as the warp threads. By the use of materials with substantially small diameters an approximately the same strength values, the separation regions are reduced considerably so that the risk of permeability is reduced. Suitable for these threads are an aromatic polyamide, preferably of aramid fiber sold under the tradename Kevlar. Since, in addition, the warp threads are mainly necessary for building up the woven fabric, the number can be very greatly reduced, so that the problems of impermeability are reduced. In addition, materials which enter into at least adhesive bonds with the outer layers, as in the case, for example, when using polyethylene threads or threads of ethylene vinyl acetate, can likewise be used for this.

When using a warp thread of glass, adhesion of the wound-around recoverable threads of polyethylene to the crossing point on the outer layer is prevented. This means that the wound-around recoverable threads in this case lie "free". On stretching, the carrier thread becomes thinner, the wound-around recoverable threads remain unstretched and get into the "stretching length of the outer layer material" from the increased spacing of the helical form. On shrinking back of the covering, each recoverable thread has the possibility of partially shrinking largely independently and consequently becoming thicker, whereby the sealing effect in the region of the warp thread is produced. Thus, even in these critical regions, the longitudinal cavities produced are filled and sealed in the region of the warp thread by the "swelling effect" of the recoverable threads. By a corresponding production of process technique, it would also be possible for no warp threads to come to lie in the stretching region of the covering. In this way, a sleeve which is tear-resistant perpendicular to the stretching and shrinking direction is produced. The warp threads outside the stretching and shrinking region then serve merely for holding together the parallel-disposed recoverable threads.

If polyethylene is chosen for the recoverable threads, the following advantages are obtained:

- since no material voids are produced, the forces required for bursting are increased;
- the material extensibility is significantly increased;
- there is a resistance to tear propagation;
- the shrinking rate and the shrinking force are higher than in the case of conventional coverings, because it is not necessary for the recoverable threads or the outer layers to be taken along at the same time;
- there is a higher thermal endurance of the surface of the covering; and
- splitting of the composite is prevented so that it is possible to dispense with an additional outer layer on the flame-bearing side.

The diameter of the recoverable threads must be chosen so that only a slight weakening of the outer layer of material takes place. It is preferable to have diameters in a range of 0.2 mm to 2 mm.

The number of times the carrier thread is spun around is set so that the recoverable threads are not additionally stretched in the stretching process of the covering with a stretching factor of 4 to 8. However, it is also possible to stretch the recoverable threads in addition during the stretching process, so that the assistance of the outer layer in the shrinking process is additionally achieved. The spinning around of the carrier threads may be a single-helical, a double-helixed, counter-helixed or be applied as a woven-fabric tube.

In all these examples, the recoverable threads contract in the shrink-back process and fill the cavities produced during the calendering and the longitudinal cavities geometrically altered during stretching to such an extent that a sealing effect is produced. Unless the recoverable threads are additionally stretched, the shrinking back of the stretched composite results exclusively from the cross-linked outer layers. Depending on the adhesive effect of the outer layers, the recoverable threads may contract even during the stretching process of the composite. As a result, the cavities produced during calendering are partially filled. In the shrinking process, this contraction and the associated thickening of the recoverable threads continues so that substantial sealing is produced in the composite as a consequence of the already-indicated "swelling effect". In normal production, the recoverable threads have a normal shrinkage, which in the case of radiation cross-linkage, obtains a degree of cross-linkage different from the outer layers. The recoverable threads may be cross-linked before the helical surrounding of the carrier thread. As a result, the mechanical strength would be increased and the tear propagation effect is stopped. It follows from this that the recoverable threads, stretched or unstretched, prevent tear propagation in the stretching process of the overall composite as a consequence of the different cross-linkage. Due to the face that a material compatible with the outer layer with respect to the adhesion is used for the spinning-around threads, thus, the recoverable threads, unlike when using glass threads, provide a good bonding of the outer layer to the recoverable threads and to the carrier threads if there is adequate temperature control so that the possibility of a flame-subjected outer layer tearing open is largely ruled out.

Other advantages and features of the invention will be readily apparent from the following description of the preferred embodiments, the drawings and claims.

BRIEF DESCRIPTION OF THE DRAWINGS

FIG. 3 is a partial cross sectional view through a shrinkable covering which comprises two outer layers with a woven fabric incorporated in between.

DESCRIPTION OF THE PREFERRED EMBODIMENTS

Figure 1:
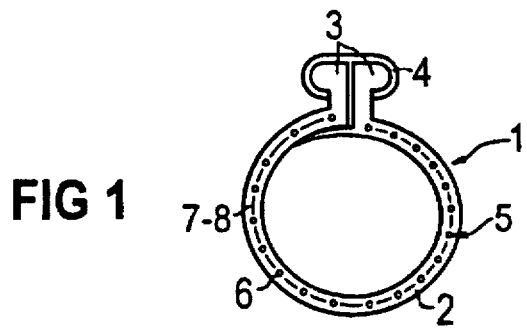
FIG. 1 is an end view of a shrinkable covering having an inlay according to the present invention.

The principles of the present invention are particularly useful when incorporated in a shrinkable covering, generally indicated at 1 in FIG. 1. The covering 1 is made of a shrinkable plastic compound 2 of a sheet-like form in which there is incorporated an inlay 5 comprising a woven fabric or a laid fabric of individual threads. It is indicated in this Figure that the heat-resistant, non-recoverable threads 6 will run as warp threads 6 in the longitudinal direction of the covering 1, which is designed as a sleeve, while the weft threads 7 and 8 run in the circumferential direction of the covering, which is the stretching and shrinking direction of the covering 1. The covering 1 in this exemplary embodiment is in the form of a sleeve, which has beads 3 which are molded along a longitudinal slit and can be held together by means of a longitudinally running rail or C-shaped clamp 4.

Figure 2:
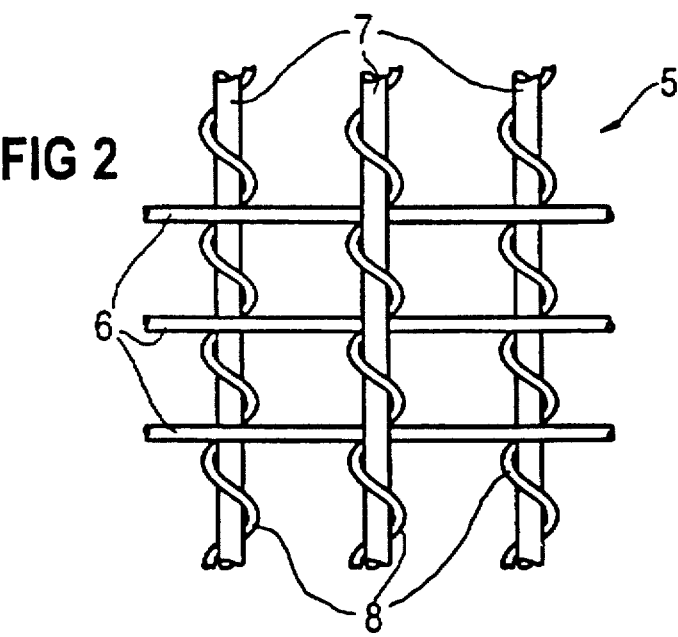
FIG. 2 is an enlarged plan view of an inlay comprising different threads in accordance with the present invention.

The inlay 5 is best illustrated in FIG. 2 and is designed here in the form of a woven fabric. The preferably heat-resistant non-recoverable warp threads 6, which are, for example, glass threads or aramid threads sold under the tradename Kevlar, in the shrinkable covering of FIG. 1 run in the longitudinal direction of the sleeve and are consequently stretched neither in the stretching process nor in the shrinking process. The situation is different, however, in the case of the strands 7 and 8, which run in the stretching and shrinking direction. The threads 7 and 8 are individual threads which are stretched in the stretching process and which have to allow the shrinkage without hinderance in the shrinking process. These strands 7 and 8 in each case comprise a stretchable carrier thread 7 of a polymeric material, for example polyethylene, and at least one recoverable thread 8 wound on the thread 7. As a consequence of the helixing or winding, these recoverable threads 8 can be drawn up in the stretching process without themselves being stretched or, in other words, the helixing is stretched so that in the drawn-out state or stretched state of the sheet-like plastic compound, there is still no stretching of the already-recoverable threads 8. In this way, it is ensured that the wound-up, already-recoverable threads do not undergo any additional stretching by the stretching process so that they consequently also will not provide any or scarcely any shrinking force for the shrinking process.

The shrinkage of the covering takes place substantially due to the shrinking forces of the cross-linked and stretched shrinking compound. As already described, the degree of helixing depends on the degree of stretching, since the recoverable threads 8 wound up in this way with excess length must correspond to the stretching length of the shrinkable covering. When the woven or laid fabric of the inlay 5 is introduced into the polymer matrix, under certain circumstances, the longitudinal capillary cavities may be provided along the strands 7–8 of the inlay 5 during calendering and during stretching. To prevent these longitudinal capillary cavities is why the present invention uses the recoverable threads 8 in the stretching and shrinking direction. These recoverable threads 8 which are, for example, wound-up on carrier threads 7 and during the shrinking process, the threads 8 serve as "swelling agents" and fill, in a sealing manner, the longitudinal capillary cavities that are produced.

Figure 3:
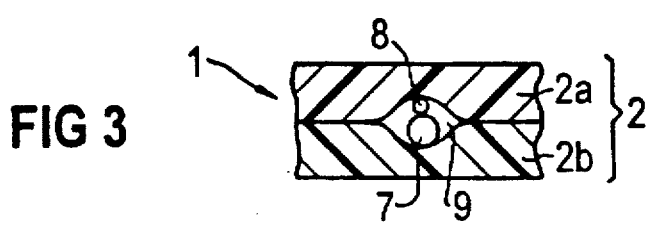

The covering of FIG. 3 has a shrinking sheet or compound comprising two shrink films 2a and 2b which adhere to one another. In the plane of the common contact in which the two layers 2a and 2b are adhesively bonded to each other, the woven or laid fabric with the fabric threads is incorporated. Here it is shown that the longitudinal capillary cavity 9 may form around the fabric strands 7–8 with the carrier thread 7 and the wound-up recoverable thread 8. For the sake of clarity, this representation in FIG. 3 is exaggerated. However, in reality, these longitudinal capillary cavities are so small that they are sealed off by the "swelling" of the recoverable threads 8 in the shrinking-back process as a consequence of their increase in the diameter of the thread 8.

Figure 4:
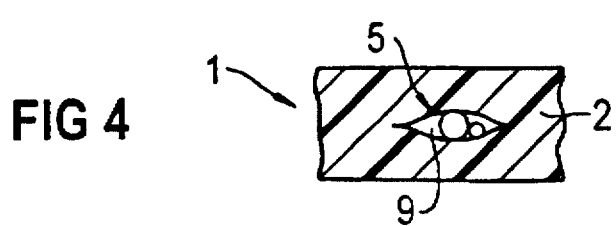
FIG. 4 is a partial cross sectional view of a shrinkable covering comprising a polymeric layer with the embedding of a woven fabric.

Another exemplary embodiment of the invention has a shrinkable covering 1 composed of a single sheet of shrinking compound or layer, as illustrated in FIG. 4. The woven or laid fabric 5 has been incorporated into this layer 2. Here, too, the material displacement during stretching may cause longitudinal capillary cavities 9 to be produced, which cavities are filled again during the shrinking process as a consequence of the increase in the diameter of the shrinkable threads 8.

Although various minor modifications may be suggested by those versed in the art, it should be understood that we wish to embody within the scope of the patent granted hereon all such modifications as reasonably and properly come within the scope of our contribution to the art.

We claim:

1. In a shrinkable covering made of a plastic compound of a shrinkable material, said covering having an inlay of thermally recoverable threads and non-recoverable threads, the recoverable threads being arranged in the stretching and shrinking direction of the covering, the improvements comprising the thermally recoverable threads being arranged with an excess length in the stretching and shrinking direction of the shrinkable covering.

2. In a shrinkable covering according to claim 1, wherein the excess length of the recoverable threads is defined so that even with the greatest degree of stretching of the covering, no stretching of the recoverable threads will take place.

3. In a shrinkable covering according to claim 1, wherein the shrinkable threads are arranged in a random arrangement with a resulting direction corresponding to the stretching and shrinking direction.

4. In a shrinkable covering according to claim 1, wherein the recoverable threads are wound on carrier threads.

5. In a shrinkable covering according to claim 1, wherein the inlay is designed as a sheet-like laid fabric of crossing threads with only recoverable threads running in one direction and only non-recoverable threads running in the second direction.

6. In a shrinkable covering according to claim 1, wherein the inlay is designed as a woven fabric, the non-recoverable threads being arranged in one direction as warp threads and the recoverable threads being arranged with carrier threads in the shrinking direction as weft threads.

7. In a shrinkable covering according to claim 1, wherein the plastic compound is composed of a modified polyethylene and is shrinkable after undergoing cross-linkage and stretching.

8. In a shrinkable covering according to claim 1, wherein the inlay is incorporated in a single layer of the shrinkable plastic compound.

9. In a shrinkable covering according to claim 1, wherein the inlay is incorporated between two bonded-together layers of the shrinkable compound.

10. In a shrinkable covering according to claim 1, wherein the recoverable threads are uncross-linked before incorporation into the shrinkable plastic compound.

11. In a shrinkable covering according to claim 1, wherein the recoverable threads are cross-linked before incorporation.

12. In a shrinkable covering according to claim 1, wherein the inlay has glass fibers as non-recoverable threads.

13. In a shrinkable covering according to claim 1, wherein the non-recoverable threads of the inlay are selected from a group consisting of aromatic polyamides and aramid fibers.

14. In a shrinkable covering according to claim 1, wherein the non-recoverable threads are composed of plastic material compatible with the plastic compound with respect to adhesion and include ethylene vinyl acetate.

15. In a shrinkable covering according to claim 1, wherein the carrier threads are composed of polyethylene.

16. In a shrinkable covering according to claim 1, wherein the recoverable threads are wound on a carrier thread as a single ring.

17. In a shrinkable covering according to claim 1, wherein each recoverable thread is wound on a carrier thread section-by-section in sub-divided lengths.

18. In a shrinkable covering according to claim 1, wherein each recoverable thread is wound on a carrier thread continuously in one length.

19. In a shrinkable covering according to claim 1, wherein each of the recoverable threads is wound on a carrier thread in the form of a helix.

20. In a shrinkable covering according to claim 1, wherein the recoverable threads are wound as a helix on a carrier thread and have an excess length so that after the stretching process, they are still not drawn out straight and, consequently, are not subjected to any additional stretching.

21. In a shrinkable covering according to claim 20, wherein the excess length of the recoverable threads is set so that the linear extension of the carrier threads by a factor less than 6 can be compensated for without the recoverable threads themselves being extended.

22. In a shrinkable covering according to claim 1, wherein the recoverable threads are shrinkable at a temperature in a range of 60° C. to 200° C.

23. In a shrinkable covering according to claim 1, wherein the inlay is subjected to a radiation cross-linkage.

24. In a shrinkable covering according to claim 1, wherein the incorporated inlay is subjected to a silane cross-linkage.

25. In a shrinkable covering according to claim 1, wherein the recoverable threads have a larger diameter after the shrinking process than during the production of the shrinkable covering, so that after the shrinking process, the longitudinal capillary cavities which were produced during the production and during the stretching process are filled by the expanding recoverable threads.

26. A method of producing a shrinkable covering made of a plastic compound of a shrinkable material and having an inlay of thermally recoverable threads and non-recoverable threads with the recoverable threads being arranged in a stretching and shrinking direction of the covering and having an excess length in the stretching and shrinking direction of the covering, said method comprising the steps of providing a sheet-like polymer matrix of the shrinkable material having a shrinking direction, providing the inlay comprising a woven fabric of recoverable threads extending in a first direction and non-recoverable threads extending in a second direction, said recoverable threads having an excess length of at least the amount of subsequent stretching of the covering, incorporating the inlay into the matrix with the first direction extending in the stretching and shrinking direction, heating and stretching the covering into a stretchable state with the amount of stretching being such that the recoverable threads are drawn out to almost the full length of the threads and without being stretched, and then cooling the covering while in the stretched state.

\* \* \* \* \*